US008548915B2

(12) United States Patent
Antebi et al.

(10) Patent No.: US 8,548,915 B2
(45) Date of Patent: Oct. 1, 2013

(54) METHOD AND COMPUTER PROGRAM PRODUCT FOR PROVIDING A RESPONSE TO A STATEMENT OF A USER

(71) Applicant: Support Machines Ltd., Petah Tikva (IL)

(72) Inventors: Amit Antebi, Hod Hasharon (IL); Hanoch Rahimi, Rehovot (IL)

(73) Assignee: Support Machines Ltd., Petah Tikva (IL)

( * ) Notice: Subject to any disclaimer, the term of this patent is extended or adjusted under 35 U.S.C. 154(b) by 0 days.

(21) Appl. No.: 13/770,744

(22) Filed: Feb. 19, 2013

(65) Prior Publication Data
US 2013/0173519 A1    Jul. 4, 2013

Related U.S. Application Data

(62) Division of application No. 13/195,208, filed on Aug. 1, 2011, now Pat. No. 8,386,405, which is a division of application No. 11/961,035, filed on Dec. 20, 2007, now Pat. No. 7,991,724.

(60) Provisional application No. 60/871,139, filed on Dec. 21, 2006.

(51) Int. Cl.
*G06N 5/00*    (2006.01)

(52) U.S. Cl.
USPC ............................................ 705/45; 707/708

(58) Field of Classification Search
USPC .......................................... 706/45; 707/708
See application file for complete search history.

(56) References Cited

U.S. PATENT DOCUMENTS

| | | |
|---|---|---|
| 4,931,935 A | 6/1990 | Ohira et al. |
| 6,269,153 B1 | 7/2001 | Carpenter et al. |
| 6,438,545 B1 | 8/2002 | Beauregard et al. |
| 6,618,722 B1 | 9/2003 | Johnson et al. |
| 6,665,666 B1 | 12/2003 | Brown et al. |
| 7,171,409 B2 | 1/2007 | Craig et al. |
| 7,409,335 B1 | 8/2008 | Horvitz et al. |
| 7,991,724 B2 | 8/2011 | Antebi et al. |
| 2002/0099730 A1 | 7/2002 | Brown et al. |
| 2002/0116174 A1 | 8/2002 | Lee et al. |
| 2002/0116176 A1 | 8/2002 | Tsourikov et al. |
| 2003/0144831 A1 | 7/2003 | Ford |
| 2005/0060301 A1* | 3/2005 | Seki et al. .................. 707/3 |
| 2006/0074845 A1 | 4/2006 | Grossmann |
| 2006/0075120 A1 | 4/2006 | Smit |
| 2007/0129937 A1 | 6/2007 | Kellet et al. |
| 2007/0239911 A1 | 10/2007 | Finnerty et al. |
| 2012/0030149 A1 | 2/2012 | Antebi et al. |

OTHER PUBLICATIONS

Hirschman et al ("Natural language question answering: the view from here" 2001).*

(Continued)

*Primary Examiner* — Lut Wong
(74) *Attorney, Agent, or Firm* — Louis J. Hoffman; William E. Markov

(57) ABSTRACT

A method for providing a response to a statement of a user, the method includes: receiving user input that comprises a portion of a user statement; selecting, before receiving a whole user statement, an answerable statement response between an answerable statement, multiple answerable statements and a response to an answerable statement; wherein the selecting is responsive to user input and to structured representations of answerable statements answerable by an answering entity; and sending to the user information representative of response to the user statement.

27 Claims, 10 Drawing Sheets

(56) References Cited

OTHER PUBLICATIONS

Li et al ("Incorporating Syntactic Information in Question Answering" 2001).*

Andrenucci et al ("Automated Question Answering: Review of the Main Approaches" 2005).*

Yee Whye Teh, "A hierarchical Bayesian language model based on Pitman-Yor processes"; Proceedings of the 21st International Conference on Computational Linguistics and the 44th annual meeting of the Association for Computational Linguistics (ACL-44). Association for Computational Linguistics, Stroudsburg, PA, USA, 2006, pp. 985-992.

* cited by examiner

Example 2:

2.1 | Can I send|
   | Can I send images
   | Can I send emails 2.2 | Can I send *emils*|
   | Can I send emails?

2.3 | Can I send emails|
   | Can I send emails?
   | Can I send html emails
   | Can I send big emails
   | *more..*

2.4 | Can I send emails ~~to the moon~~?|
   | Can I send emails to mobile phones?
   | Can I send emails?
   | How to send emails?

Example 3:

3.1 | e|
   | email
   | entertainment
   | *more..*

3.2 | email |
   | what is email?
   | sending email
   | receiving email
   | email password

3.3 | receiving email |
   | Problem when receiving email
   | How to receive email
   | receiving email from the web

| Multi: | Id | statement | Say | | | | Extras |
|---|---|---|---|---|---|---|---|
| MultiItem1 | Id | statement | Say | DisplayedAs | DisplayOptions | NextCmd | Extras |
| MultiItem2 | Id | statement | Say | DisplayedAs | DisplayOptions | NextCmd | Extras |

METHOD AND COMPUTER PROGRAM PRODUCT FOR PROVIDING A RESPONSE TO A STATEMENT OF A USER

RELATED APPLICATIONS

This application is a division of U.S. patent application Ser. No. 13/195,208, filed Aug. 1, 2011, now U.S. Pat. No. 8,386,405, which is a division of U.S. patent application Ser. No. 11/961,035, filed Dec. 20, 2007, now U.S. Pat. No. 7,991,724, which claims the benefit of U.S. Provisional Patent Application Ser. No. 60/871,139, filed Dec. 21, 2006, each of which is hereby incorporated herein by reference in its entirety.

FIELD OF THE INVENTION

The present invention relates generally to the field of communicating with a computer system in natural language and in particular, to methods and systems for conversing with a human and answering his statements over a specific knowledge domain using natural language and through a textual interface. "natural language" shall mean in the context of this invention as any human language such as English

BACKGROUND OF THE INVENTION

As computers and communication networks are continually becoming stronger, faster and more accessible—more information and knowledge is being moved from people and printed materials to computers.

Accessing that knowledge is traditionally done using computer-search methods and search engines. But these methods do not enable the searcher to get direct answers for his statements, or to converse about a topic. And the searcher is often required to browse through search results or to readjust his search query.

It is therefore highly desirable, to enable computers to answer and/or converse about information in natural language. This task is considered difficult with current technology and as of today there exist no system that successfully converses or answers statements with high accuracy and relevancy of results. We propose a method and system that can perform the above task successfully.

There is a growing need to provide efficient methods, systems and computer program products for providing a response to a statement of a user.

SUMMARY OF THE INVENTION

A method for providing a response to a statement of a user, the method includes: receiving user input that includes a portion of a user statement; selecting, before receiving a whole user statement, an answerable statement response between an answerable statement, multiple answerable statements and a response to an answerable statement; wherein the selecting is responsive to user input and to structured representations of answerable statements answerable by an answering entity; and sending to the user information representative of response to the user statement.

A method for interacting with a person, the method includes: receiving a user textual input; matching a structured representation of the user textual input against expected expected user statement fields of knowledge database entries; wherein a knowledge database entry includes an expected user statement field and at least one action field; wherein multiple entries of the knowledge database form a data structure that includes multiple expected user statements fields that match an expected sequence of user textual inputs.

A computer program product includes a computer usable medium including a computer readable program for providing a response to a statement of a user, wherein the computer readable program when executed on a computer causes the computer to: receive user input that includes a portion of a user statement; select, before receiving a whole user statement, an answerable statement response between an answerable statement, multiple answerable statements and a response to an answerable statement; wherein the selection is responsive to user input and to structured representations of answerable statements answerable by an answering entity; and send to the user information representative of response to the user statement.

A computer program product includes a computer usable medium including a computer readable program for providing a response to a statement of a user, wherein the computer readable program when executed on a computer causes the computer to: receive a user textual input; match a structured representation of the user textual input against expected expected user statement fields of knowledge database entries; wherein a knowledge database entry includes an expected user statement field and at least one action field; wherein multiple entries of the knowledge database form a data structure that includes multiple expected user statements fields that match an expected sequence of user textual inputs.

BRIEF DESCRIPTION OF THE DRAWINGS

The present invention will be readily understood by the following detailed description in conjunction with the accompanying drawings, wherein like reference numerals designate like structural elements.

A method for providing a response to a statement of a user, the method includes: receiving user input that includes at least a portion of a user statement; selecting an answerable statement response between an answerable statement, multiple answerable statements and a request to receive answerable statement selection information; wherein the selecting is responsive to user input and to structured representations of answerable statements answerable by an answering entity; sending to the user the answerable statement response; receiving an acceptance indication from the user indicative of a user acceptance of an answerable statement; sending to the answering entity information representative of the accepted answerable statement; receiving from the answering entity the answering entity response; and sending to the user information representative of the answering entity response.

Figure 1:
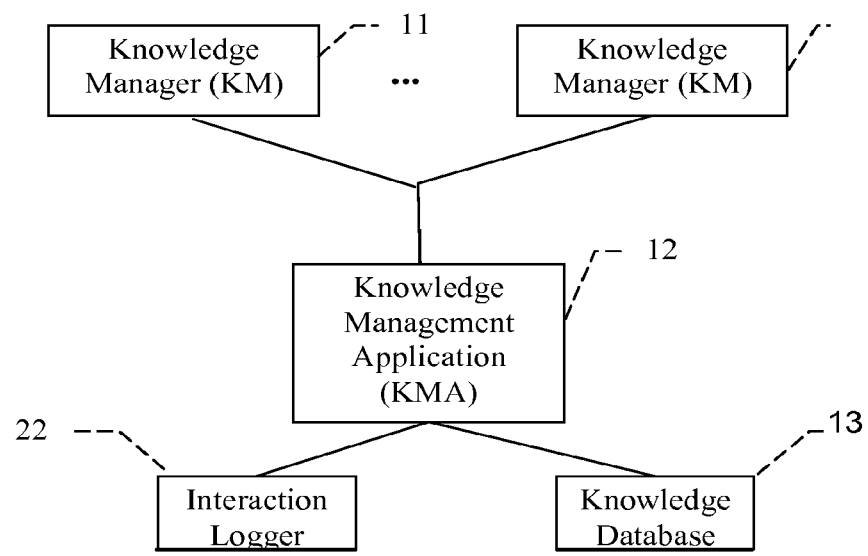

Conveniently, the multiple answerable statements include answerable statements that at least partially match the user input.

Conveniently, the method includes performing a weighted comparison between basic information units extracted from the user input to basic information units associated with each of the multiple answerable statements.

Conveniently, the method includes selecting between multiple answerable statements displayed to the user in response to audio information provided by the user.

Conveniently, the method includes comparing the initial user input to a data structure that includes multiple expected user statement fields, each associated with a request to receive answerable statement selection information.

Conveniently, the method includes comparing the user input to the data structure; wherein the data structure further includes at least one expected user statement field that is associated with an answerable statement.

Conveniently, the method includes sending to the user multiple answerable statements that are associated with each other.

Conveniently, the method includes detecting a problem in providing an answerable statement to a user and sending a request to provide human assistance in responding to the user input.

Conveniently, the method includes presenting to the user multiple answerable statements that were sent to the user and resulted in an acceptance of a certain answerable statement by the user; and receiving an acceptance indication from the user indicative of an acceptance of another answerable statement out of the multiple answerable statements.

Conveniently, the method includes updating selection metadata in view of at least one response of at least one user to at least one answerable statement response; wherein the selection metadata affects the selection of the answerable statement response.

Conveniently, the method includes applying natural language scripts during the selecting of the answerable statement.

Conveniently, the method includes selecting a single answerable statement if the single answerable statement and the user input are characterized by a matching value that exceeds a first threshold and selecting multiple answerable statements if each of the multiple answerable statements and the user input are characterized by a matching value that exceeds a second threshold but is below the first threshold.

Conveniently, the method includes: receiving user input that includes a first portion of a user statement; selecting an answerable statement response between an answerable statement, multiple answerable statements and a request to receive answerable statement selection information; wherein the selecting is responsive to the user input and to structured representations of answerable statements answerable by an answering entity; sending to the user the answerable statement response; receiving user input that includes a second portion of a user statement; selecting an answerable statement response between an answerable statement, multiple answerable statements and a request to receive answerable statement selection information; wherein the selecting is responsive to the first portion and to the second portion of the user statement; sending to the user the answerable statement response; receiving an acceptance indication from the user indicative of a user acceptance of an answerable statement; sending to the answering entity information representative of the accepted answerable statement; receiving from the answering entity the answering entity response; and sending to the user information representative of the answering entity response.

Conveniently, the method includes generating a knowledge database of an answering entity by converting knowledge manager input into a structured representation of the knowledge manager input.

Conveniently, the method includes providing to the knowledge manager input feedback information indicating of a suggested knowledge manager input.

Figure 1A:
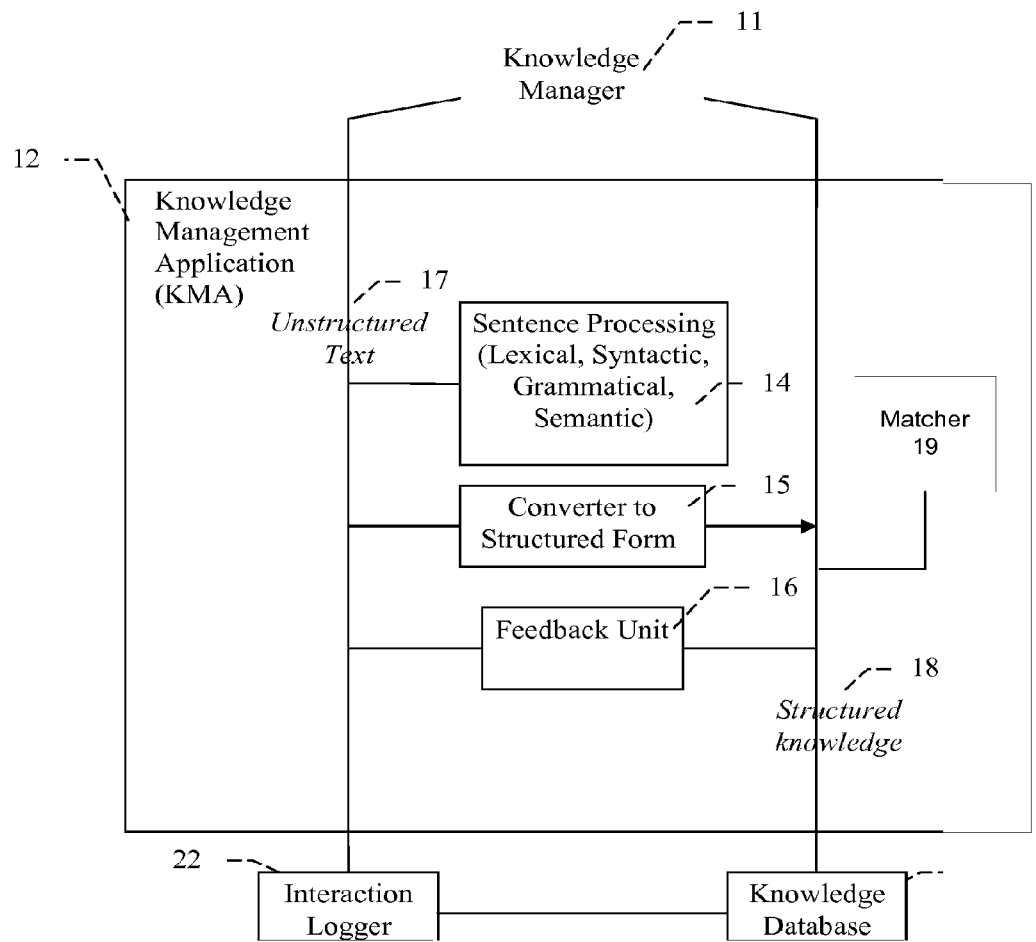
Figure 2:
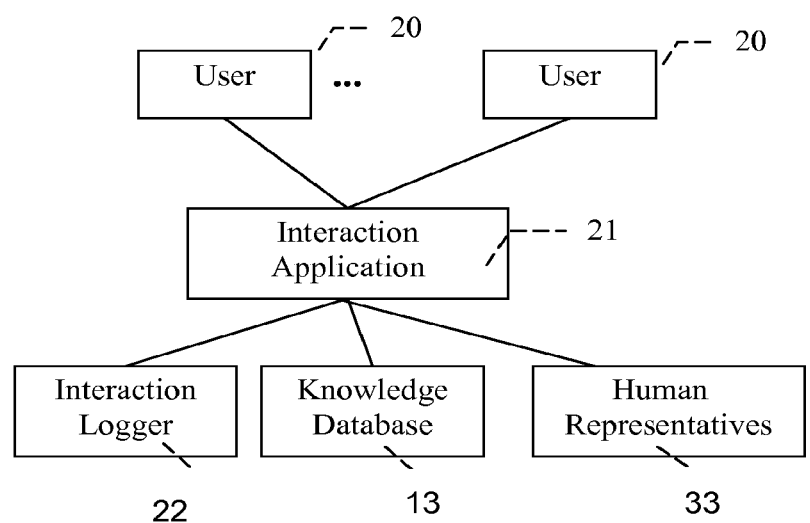
Figure 2A:
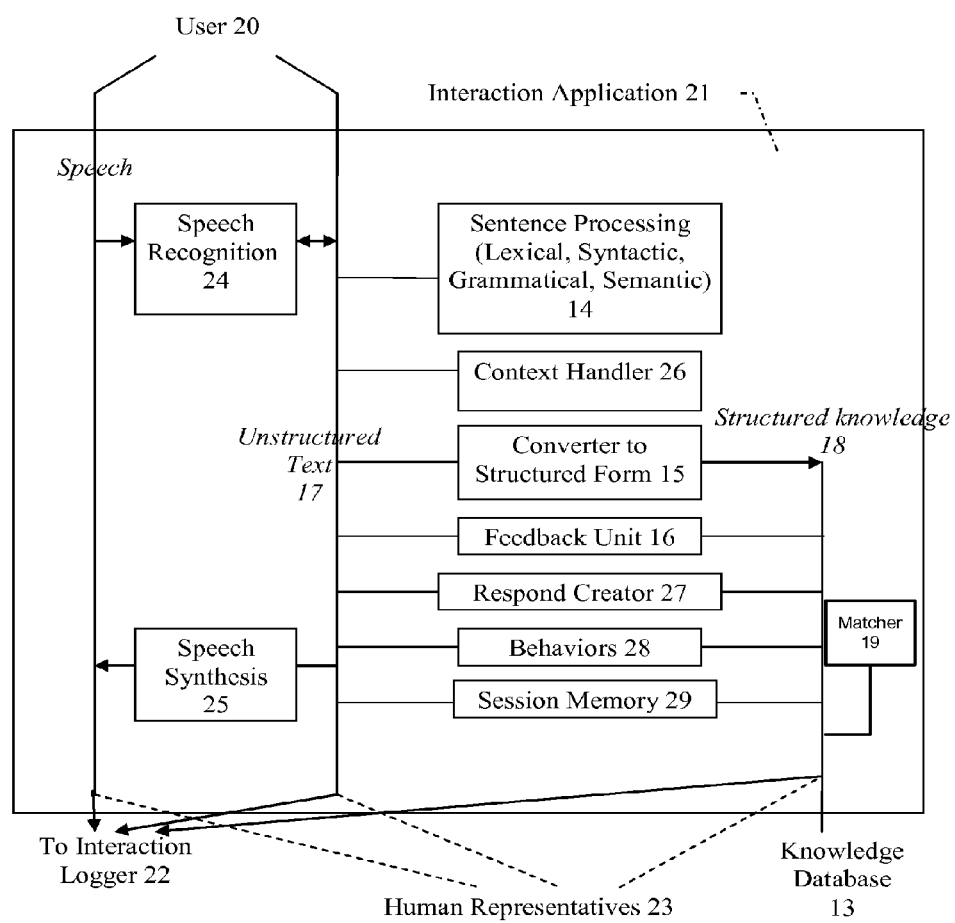
Figure 3:
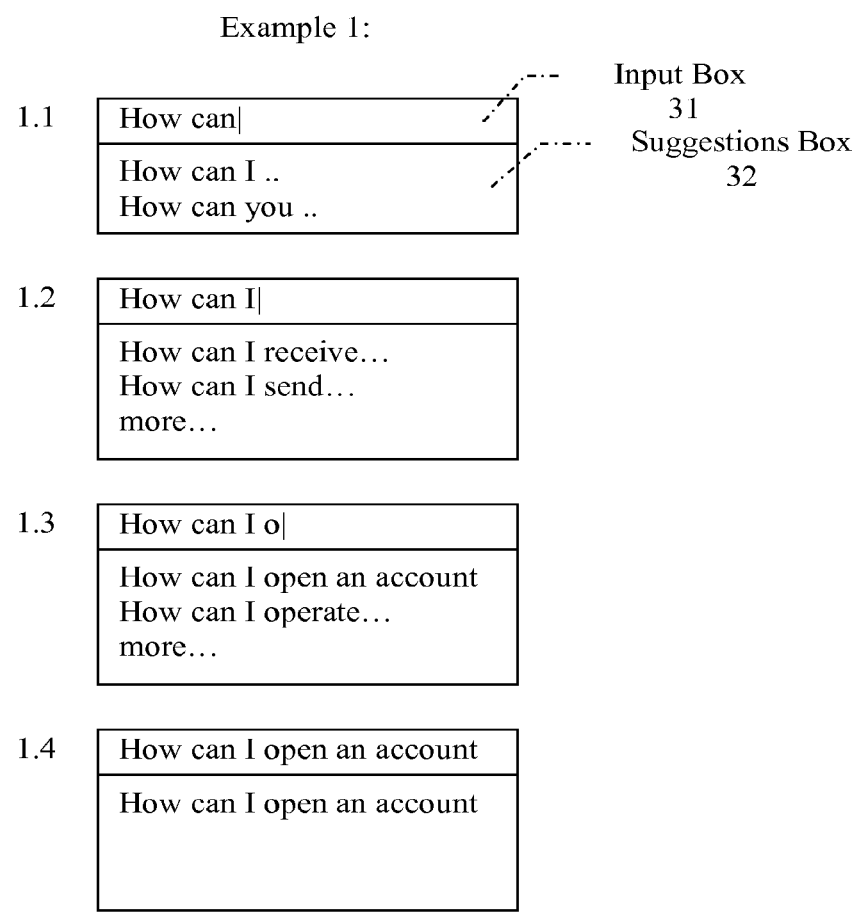
Figure 3B:
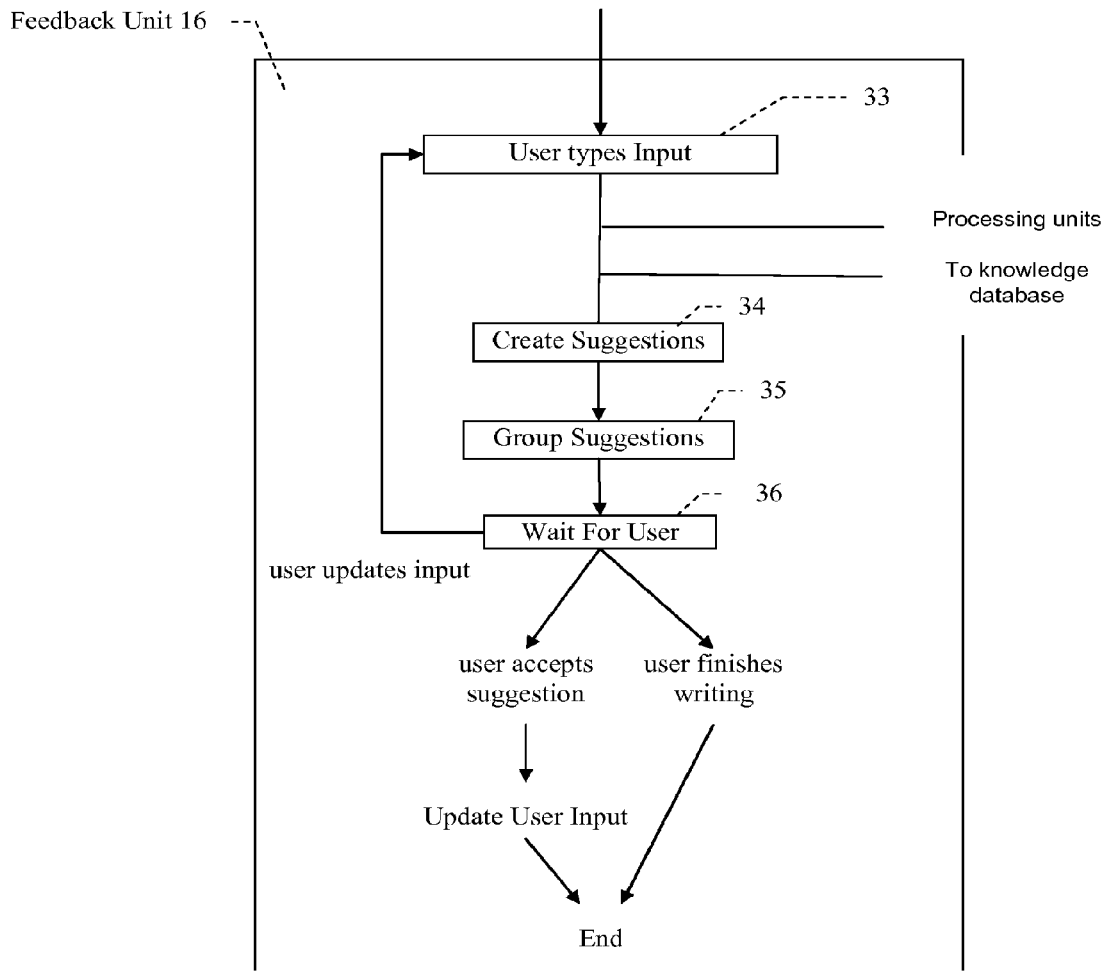
Figure 5:
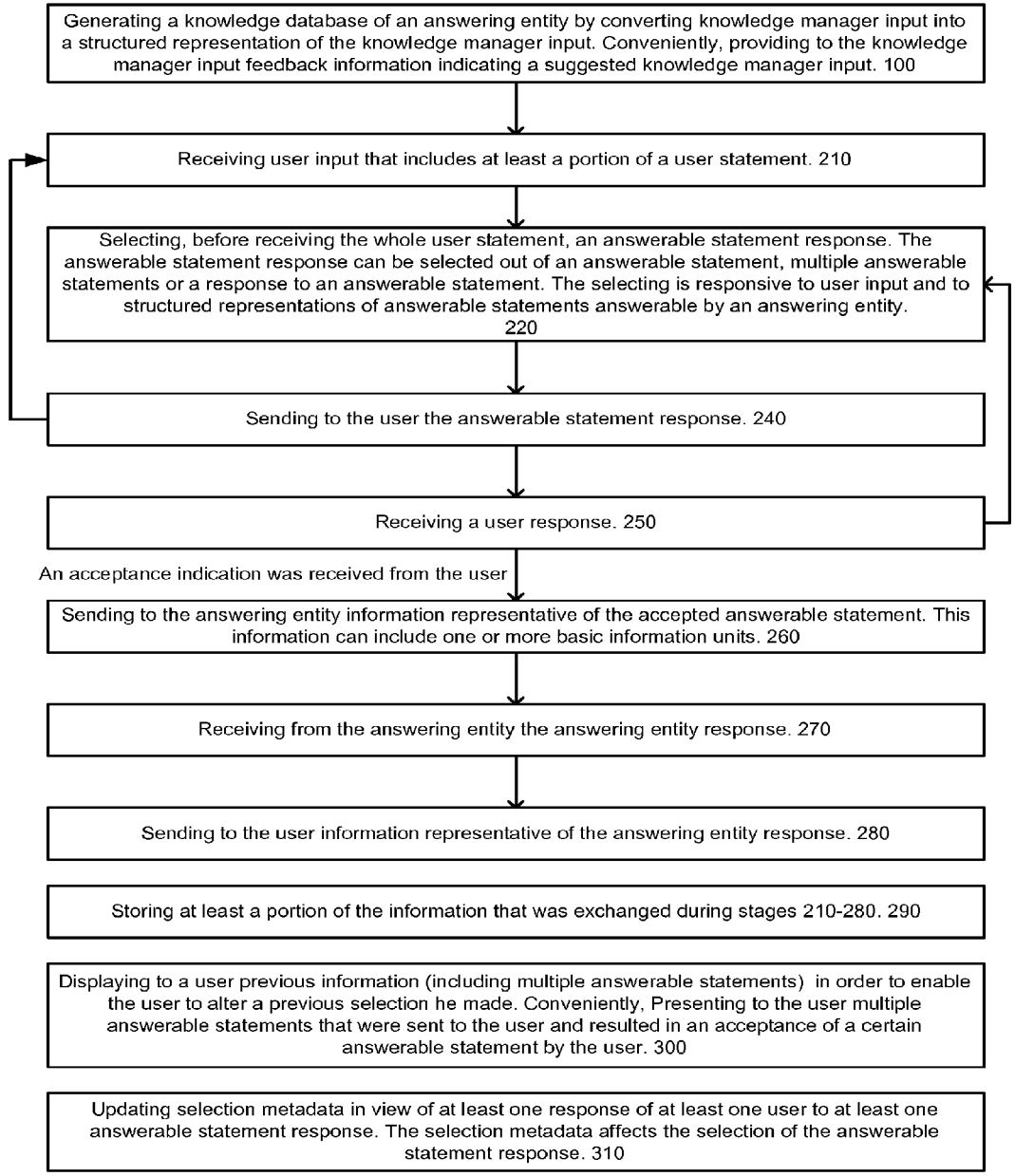
Figure 6:
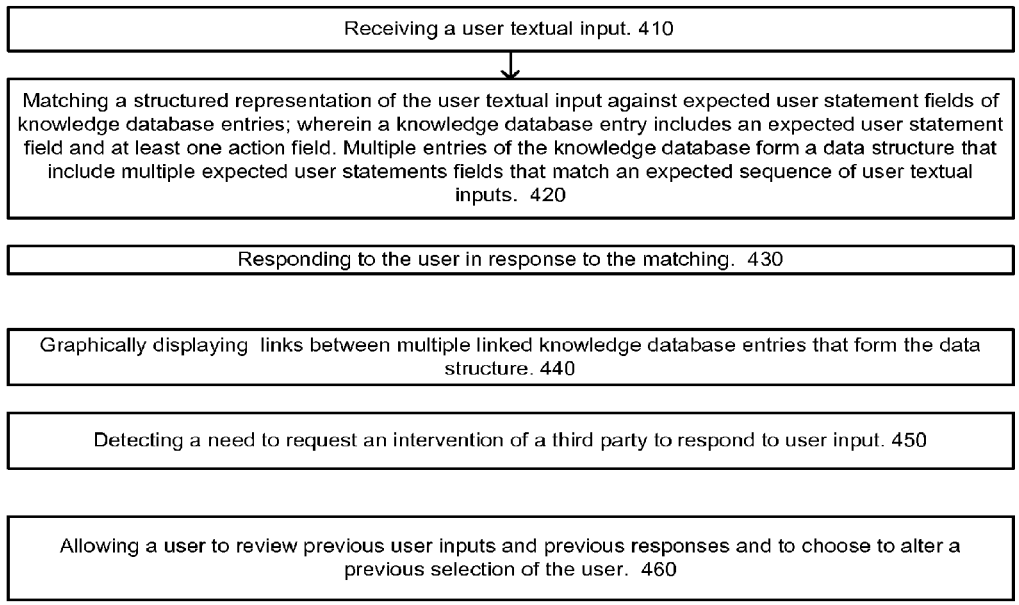

FIG. 1 is block diagram of an application for updating a knowledge database of entities that interact with the answering entity according to an embodiment of the invention;

FIG. 1A illustrates a knowledge management application and additional entities according to an embodiment of the invention;

FIG. 2 is a block diagram of users and a system for responding to users according to an embodiment of the invention;

FIG. 2A is an illustrative block diagram of an interaction application according to an embodiment of the invention;

FIGS. 3 and 3A illustrates various screens presented to a user during a statement evaluation stage according to an embodiment of the invention;

FIG. 3B is a flow chart of a feedback process according to an embodiment of the invention;

FIG. 4 illustrates a command according to an embodiment of the invention;

FIG. 5 illustrates a method, according to an embodiment of the invention; and FIG. 6 illustrates a method according to an embodiment of the invention.

DETAILED DESCRIPTION OF THE DRAWINGS

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention. Lines without arrowheads, in the context of this patent should be interpreted as bidirectional communication lines, in contrast to arrowheaded lines.

Computer systems that can converse with a user and answer user statements about specific knowledge domains are disclosed. Methods are disclosed that offer a good tradeoff between system performance and knowledge building efforts.

The suggested methods and systems can converse in text, such as in chat through computer (web-chat or phone-text messaging), and to some extent e-mails. It is noted that speech recognition and additionally or alternatively speech synthesis capabilities or modules can be used in order to enable speech conversations such as by conventional phones.

The applicability of the current invention is suitable to any computer-human interaction. However, it is especially suited to human interactions such as customer support, customer service, sales, promotions, inquiring, learning and training. One exemplary beneficial embodiment is adding a computer chat interface in a company's website and allowing visitors to chat about the company, its products and services, promotions, to get suggestions about products, to get help matching customer needs to company offerings, to be surveyed, and to send statements to offline personnel—all, and other similar activities, with immediate respond from the website and 24/7 availability. There is no current system doing the above with satisfactory results.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

Conveniently a method for conducting natural language dialogue with a user without human intervention is provided.

Conveniently, a knowledge database is formed. Adding knowledge to the knowledge database, does not require programming skills such as defining a pattern matching rule nor does it require to decide where in the knowledgebase to file the newly added piece of knowledge, nor is it a blind process of feeding full documents to the system (such is the case in search engines).

FIG. 1 is block diagram of knowledge management application 12 and of entities 11, 13 and 22 that interact with the answering entity according to an embodiment of the invention.

Knowledge Management Application (KMA) 12 processes input from KM 11 input in the by the same mechanisms that process the user inputs. And the feedback mechanism alerts KM 11 about possible spelling errors, and the like.

Knowledge Manager (KM) 11, is a human who preferably is acquainted with the specific knowledge domain, can access KMA 12 which can be a software application running on a local or remote computer. KMA 12 can include middleware modules, hardware modules, software modules or a combination thereof. KMA 12 receives information from KM 11 and transforms it to structured knowledge that is stored in knowledge database 13. This knowledge will be used later by the computer to communicate using natural language. Knowledge database 13 can include a structured representation of answerable statements and a structure representations of responses to these answerable statements. A statement is answerable if it can be answered by (one or more) answering entities (such as but not limited to KD 13) that can interact with KMA 12 or be accessed by KMA 12. The building blocks of the structure representation of answerable statements are called basic information units, and represent words or word groups. "words" and basic information units will be used here interchangeably.

KMs 11 are using KMA 12 in order to periodically append, update, or delete knowledge pieces from knowledge database 13.

Conveniently, multiple KMs 11 can work concurrently on the same KMA 12 and knowledge database 13, and then each knowledge operation can be stored with the details of the KM 11 creating or updating it. In the possible case where the KMA 12 will be running at a distant location, KMs 11 can access it through network/internet connections, and many different knowledge domains could be served and hosted on the same server as in the SAAS (software as a service) model. The information that the KMs 11 are inputting (also referred to as knowledge manager input or knowledge manager information) to KMA 12 may originate from KM 11 or can be provided from various computerized or un-computerized documents. A knowledge piece can be stored together with a bidirectional link to its origin (such as document) so that it can be possible to get alerts when the original data is changed, in order to update it in knowledge database 13.

In cases where the information required to be computerized resides in an external database that is updated regularly (such as product prices and availability database) this external database does not necessarily need to be cloned to knowledge database 13. Conveniently, knowledge database 13 can serve as a mediator that queries the external database and retrieves the answer.

Knowledge database 13 can be a custom dictionary of words (also referred to as basic information units) and words families (also referred to as basic information unit families). It includes synonyms, hypernyms, hyponyms, multiple-word phrases, and other word relations as one wants to add.

This dictionary can be indexes for fast access (as by hash tables), and the words and word-groups in it will be the building blocks used by the structured-form representation.

Conveniently, knowledge database 13 includes a list of stop words (language words that have very low importance like "are" "very" "moreover", "that").

Conveniently, knowledge database 13 includes a list of "semi-stop words" that are words that will have medium importance level later on. these can include numbers, names (of months, days), common verbs and adjectives (say, look, see, good, like)

Knowledge database 13 conveniently includes at least one structured representation of at least one of the following items: (i) Statement and answer pairs (QA); (ii) Conversation Scripts (CS); (iii) Information pieces in unstructured form; (iv) interaction log pieces; (v) Original KM's input; (vi) reference texts which are the origin of an information piece.

FIG. 1A illustrates knowledge management application 12 and additional entities 22, 13 according to an embodiment of the invention. It is noted that the various boxes of FIG. 1A represent method stages but can also represent modules. For example, box 14 is denoted "sentence processing" but it can represent a sentence processing module.

Information inputted by KM 11 to KMA 12 can be a statement-answer pair, a statement describing something or a Natural Language Script (NL Script). The statement can be a question, a query, an answer, a problem description and the like.

KMA 12 conveniently transforms this (unstructured) information into structured knowledge 18 that can be used by the computer in the future to match a human statement or statement with the structured knowledge 18 stored in the Knowledge Database 13, even if the human has used different wordings or different sentence structure. To serve this purpose, structured knowledge 18 is represented either as a canonical natural language statement, or, as a graph of connections between concepts, properties, actions, and relations that represent language elements.

The process of transforming unstructured text 17 to structured knowledge 18 involves several steps.

The sentence processing 14 step includes at least one of the following stages or a combination thereof: comparing words and phrases in the information to a general or special dictionary, detecting possible spelling errors, determining word part-of-speech, parsing sentence and separating them to phrases, functional roles and main versus auxiliary parts of the sentence, identifying multi-word phrases, converting synonym words to their word group name, and transforming sentences to basic tense. The end result of this purpose is to extract the relevant information in order to transform by the converter 15 (also referred to structured form converter) the unstructured text 17 to structured knowledge 18.

Conveniently, sentence processing includes: (i) receiving input in the form of unstructured text. i.e. "how can i send mail without revealing my address"; (ii) for each word in the input above do the following processes: (ii.a) converting to base word (this is called word-stemming and is comprises of removing 'ing"es"ies"ed"able' etc.; (ii.b) looking for this word in the knowledge database 13 custom dictionary and in the stop-words and semi-stop words lists; (ii.c) if an exact match is not found, checking against the database for a word that may have been typed with an error (using a spelling correction algorithm); (ii.d) if the word is in the knowledge-base thesaurus, remember its word group name' and remember these two alternative representations (the word and the word-group); (i.e) look this word up in the general language dictionary. If it does not exist or if its corpus popularity is very low, it will signify that this word might have been misspelled and a spelling correction search would be done to look for a more probable word in the dictionary.

At the end of the above process, the algorithm will have, for each processed word, a list of candidate basic information units. Some of the above sentence processing steps can be used depending on the programming resources in hand— exemplary implementations can be found on many book and papers in the field of Natural Language Processing (NLP). Even if one resorts to the simplest implementation that is to store the original unstructured text 17 as structured knowledge 18 with minimal intervention—even then—the system can work properly but it will require more discipline from the KM 11 so that he will input information in a consistent and simple form.

According to an embodiment feedback unit 16 can provide to the KM feedback that eases the input of information. Feedback To aid KM 11 in inputting consistent information—such that he does not repeat himself; can see what related information is already stored; remove un-important parts of the sentence; correct spelling errors and the like—Feedback Unit 16, feedbacks him in real-time as he types with all sorts of signals and suggestions as described on FIG. 3 or 3a.

Additionally, KMA 12 can aid the KM 11 by showing him the proposed conversion to structured knowledge 18 and enable him to accept or change the representation. In some simple cases, the conversion mechanisms mentioned above can let the computer go over information and convert it, with minimal or no KM 11 supervision. In many cases an automatic conversion would produce insufficient results, and a semi-automatic method (that includes multiple iterations of exchange if information) can be applied.

Once a structured knowledge 18 is built it is stored in knowledge database 13 for later usage. If the structured knowledge 18 is a statement-answer pair, then the answer can be stored as it is—in unstructured form—and only the statement needs to be converted to structured form 18 since this is the part that we want to match against a the user input.

Converter to structured form 15 can provide a structured-form (also referred to as a structured representations of answerable statements) that can be a concise version of the sentence. It is noted that the KM can be requested to try to use as few as possible words when adding a new piece of information. Thus, as few basic information units should represent an answerable statement and a response to that answerable statement.

It is noted that such representation of answerable statements or responses requires no programming skills or complex data structure understanding in order to add knowledge, and the hard work of adding the knowledge at the proper point in the database, is spared from the KM.

Converter to structured form 15 takes all the basic information units obtained from the sentence processing module 14, and creates one or more structured representations of answerable statement.

For each of the above candidate basic information units, there will be an importance-weight associated with it. This weight will be determined from the word's properties as stored in the Knowledge Database (i.e. stop-words would get a very low weight, semistop words would get a medium weight, and other words would get a high weight or something that will depend on their popularity or importance in the database). The weight can also be altered by the word's position and grammatical function in the original unstructured text (i.e. if a language parser is used then the weight of the subject and verb can be higher then the weight of auxiliary or main-sentence modifiers.). The word weight can also be determined or altered by the KM itself before or after he sees what the above algorithm has done using the feedback mechanism, or other means.

The converter's 15 outputs a list (or graph or other data structure) of basic information units that represent a natural language sentence. And each basic information unit has an importance weight, signifying its importance in the full sentence.

An example of a conversion to a structured form is provide below: (i) A user can provide user input such as "I love it when you surprise me with special offers"; (ii) KM 11 previously provided a KM input—an unstructured concise natural language sentence or graph of words. "I like special offers" (after the KM has left only the crucial words, in the process he also defined the terms "like" and "love" as synonyms in the custom dictionary, if they haven't already have been defined in the general dictionary as such, and he has added "special offers" to the list of phrases)

Structured form of an answerable statement can include a combination of one or more basic information units. In the above example, the internal representation of the structured form will be: "C_I C_like Cspecial_offers" where the "C_" means that this is a basic information unit object defined in the KD with all its associated properties (synonyms, importance weight etc, part of speech etc.)

Matcher 19

Matcher 19 receives structured data and can interact with an answer entity such as knowledge database 13.

After the user input (when responding to the user) or KM's input's (when updating or generating knowledge database 13) are converted to structured form, the next step is to find the closest structured form's that are stored in KD 13. The brute force approach would go over all the structured forms entries in KD 13 and compare the basic information units of them against basic information units in the user (or KM) input. According to another embodiment of the invention the KD 13 indexes the basic information units and uses this index in order to access KD 13. This can involve applying hash function.

According to an embodiment of the invention a weighted comparison is conducted between basic information units extracted from user (or KM) input to basic information units associated with each of the multiple answerable statements stored in KD 13.

A sample comparison is illustrated below. The following definitions are used: (i) Inp—the structure form the was converted from the User or KM's inputs; (ii) Db—a structure form stored in the KD; (iii) Mu—the basic information units which are mutual to both Inp and Db; (iv) InpW, DbW, MuW—the sum of basic information unit importance weights in Inp, db, Mu The comparison is based upon the assumption that the higher MuW/InpW and MuW/DbW the better the match. Multiplying these two terms will give a good measure of the fit with a max value of 1 and min value of 0. Improvements on the formula can include smoothing the division effect when DbW or InpW are low, or by using a sigmoid like function. And a threshold can be set to determine of the fit is excellent good or insufficient.

Once the best matches have been identified, they are being sorted and outputted to the next stage in the computation.

Feedback Unit 16

Feedback unit 16 can be used during the update or generation of KM 13 and also when responding to user input.

During the update or generation of knowledge, the feedback unit 16 can (continuously or non-continuously) monitor the output of sentence processing module 14 and converter to structured form 15 (as the KM is typing or inputting the knowledge) and present to the KM the intermediate or final results of these units.

So that If for example there are several options for which basic information unit to use to represent a certain word then feedback unit 16 can send these options to KM 13 and let him choose, or shows him what is the automatic choice. (i.e. if apple means a computer company basic information unit, a fruit basic information unit, or the specific computer company "apple", or the specific fruit "apple").

If for another example, a related or identical piece of knowledge already exists in KD 13, feedback unit 16 shows this to the KM and he can adjust delete or connect his newly added information to the existing one.

After the KM approves the structured from representation of his knowledge, the structured form as well as the unstructured form are saved in the KD for future retrieval by the interaction application.

This can be useful for electronic devises with small screen—such as cellular phones, and the picking from the list could preferably be done by saying "one" "two" . . . etc, and using a simple speech recognition mechanism FIG. 2 is a block diagram of an illustrative system and method for retrieving answers in respond to user inputs. One or more users 20 communicate with the interaction application 21. The interaction is bidirectional—the user asks and supplies information. And the computer (through the) asks and supplies information.

Additionally, in the present invention there is another type of interaction between computer and User 20—it is in the form of feedbacks that the Interaction Application 21 gives to the user regarding the User's 20 inputs. This helps and guides the User 20 as he types, to see what the computer does or does not knows and understand.—More to be described later on FIG. 3-3b. The Interaction Application 21 processes the User 20 input, in a similar way as the Knowledge Management Application 12 did, with the goal of transforming the User Input into a structured form After being transformed to structured form, Matcher 19 matches up the User's 20 inputs against the inputs that are stored in the Knowledge Database. The best matches that are found are sorted and ranked and an answer is produced by the Response Creator. The response may be a straight answer, or it can involve running a NL Script, whatever response was defined by the KM at the time of knowledge creation. The response is supplied back to the User 20 in the form of text graphics sounds etc.

The interactions are preferably logged and stored by interaction logger 22 for later analysis. One important usage of the Interaction logger 22 is to alert the knowledge managers 11 on unanswered or misunderstood conversations with user 20—thus enabling knowledge mangers 11 to continually extend the knowledge stored on the system from user 20 conversations.

At certain applications it may be beneficial to have a human representative 23 communicating with users 20. Such that difficult statements or special issues are resolved by human representatives 23, while simple statements can be answered by the computer. The advantage of this over full human service is by lowering the costs of answering simple statements. In these cases, interaction application 21 can choose to direct users to Human Representatives 23 according to some criteria such as: user profile, user statement/statement. These redirections to humans can be stored in the Interaction Log 22 and later be analyzed in order to improve the system and reduce the need to direct to humans. Interaction application 21 can send a request for human intervention to the human representative and get their response.

Interaction application 21 can include visual aids such as a static or dynamic pictures such as a talking human. This can enrich the user's experience and give him the feeling that he is talking to a human and not a computer FIG. 2A is an illustrative block diagram of the inner workings of the interaction application 21 according to an embodiment of the invention.

User 20 communicates (provides user input) either by providing text information or by using speech that is converted to textual information by a speech recognition unit 24.

Speech recognition unit 24 and speech synthesis unit 25 can provide the needed translation. As of today, Speech Synthesis 25 has reached a good level of technological maturity and can be used successfully to translate computer's text response to speech. Commercial Speech Recognition 24, however, shows worse results and thus for the present time it is recommended to stick to text communications from the User side where possible. An alternative possibility is to improve on commercial Speech Recognition products by integrating them with our system in such a way that they will use the Knowledge Database 13 to reduce speech recognition ambiguities by checking each speech ambiguity against its compatibility with language and knowledge rules, thus canceling un-probable sentences.

The user input is processed by sentence processing module 14, the converter to structured form module 15, and matcher 19, similar to the way it was done in the context of the KMA, only that this time ambiguities will not be presented to the user as they were presented to the KM, so if for example the word "apple" is used by user 20 (is included within user input), the converter to structured form module 15 would have to test all the meanings of the word (fruit, software company, . . . ), and try to rank them according to frequent usage or conversation, and let the response creator to—either choose the best one, or present them to the User for him to choose.

User 20 does not necessarily inputs his user input in simple and consistent way, as KM is expected to do, but matcher 19 performs weights based comparison, the weights being provided, for example, by converter to structured form module 15, and irrelevant language words have a smaller effect then keywords (basic information units of importance), thus allowing for good matches to be made nonetheless.

Before the user input is matched against general knowledge database entries, it is matched against a subset of the knowledge database, wherein the subset can be selected in response to the context of the conversation. This selection of the database subset can be done by context handler 26.

Response Creator 27

One response to an answerable statement involves providing a response from knowledge database 13 and just send it to user 20. Yet another response also includes not just a list of best-matching structured forms but also their match metric. Yet a further response includes sending to the user a single response (for example—a single answerable statement) if an excellent match exists—if a matching value exceeds a first threshold of is exceeded (match level>ExcelentThreshold). Another response can include multiple good matches—if their matching values exceed a second threshold but do not exceed the first threshold (match levels>GoodThreshold). In this case these answerable statements are suggested to the user to choose but don't immediately show their response. If no good matches are found, the response creator 27 can raise an event to the behavior unit (28) that in turn either outputs an "I don't know" type of answer or produces a behavior that tries to communicate with the user and better understand what he wants.

Conveniently, the response creator 27 can include dynamic content creating i.e. using dynamic information such as the user name, in the outputted response.

Conveniently, the interaction system offers the user choice (such as when there are a few possible completions, or when it is not sure what the user meant) and the User is making a choice—is an opportunity for the system to improve over time, by keeping records of what users are picking (and give it higher rank in the future) and what they are not picking (and give it lower rank). These records of what users are picking are a non limiting example of selection metadata. Selection metadata affects the selection of the answerable statement response Interaction Logger 22

The interaction logger records the conversations with Users. The recording has several important usages: (i) User interactions that yielded no answer (identified either when the matcher does not find a good enough match, or when the User expressed his dissatisfaction by saying or pressing a 'I am not satisfied' link) are marked and presented to the KM In his next interactions with the KMA. Sometimes the user is saying something in the middle of an NL script. In this case the KMA will link the relevant point in the NL script to this problematic log, and the KM can later add or update the NL script accordingly. (ii) For marketing and support analytics: identifying areas of difficulties, or interest. This is done by storing the usage frequency of a certain structured piece of knowledge and analyzing it's trend over time. (iii) To be stored together with all other user communications in the CRM system, to be used later either by a human representative or by the Interaction Application itself for continued support. (iv) Presenting unanswered or poorly answered user inputs so that a KM can see them when he works on their relevant basic information units or relevant natural language script This would allow the KM to quickly improve the system: add missing knowledge and for easy improvement in the KMA. The detection of such user inputs would be done by identifying user actions such as: pressing a 'that's not what i meant link', or saying something like "I don't understand"! "I already tried that"—all sentences which are stored in the Knowledge Database in structured form and are identified just as any other sentence is identified. The nature of many interactions such as customer support interactions is that a User asked an initial statement or states a problem or symptom, and the Agent identifies the issue from all the knowledge base content and either 1. Gives a direct answer or 2. starts a flow-chart like process of asking the User for additional details and guiding him through the process according to his answers. These flowcharts like processes can conveniently implemented using NL Scripts as will be described.

After this handling the structured knowledge (structured representation of user input that can include one or more basic information units) 18 is compared with stored pieces of knowledge (basic information units representative of answerable statements) in knowledge database 13, and feedbacks are sent by feedback unit 16 to user 20 regarding how the computer understood his sentence, and what the computer can answer (answerable statements) and can not be answered. When user 20 finishes writing/talking and optionally updating his sentence, respond creator 27 fetches the most appropriate response (such as an answering entity response) from knowledge database 13 and sends it back to user 20.

At some time it may be appropriate or helpful for the computer to initiate a conversation such as trying to sell something to the User 20, or asking for contact information. Behaviors Unit 28 is responsible to initiate such conversations If conversation logs are displayed such that historic user inputs and system outputs are not erased from the screen and can be reviewed by the User, then the User can scroll back in the conversation log, and make try different choices then what he has made. The system would them jump to the point in the conversation, where this option has been presented to the user, and continue from there. A convenient way to implement this is to store in memory for each possible conversation re-entering point, the conversation state—such as the context handler's state and the NL Scripts state.

This is especially useful in Natural Language Scripts, that diagnose a problem by asking a user to make some checks and to answer some statements; if the user is, along the process, discovering that he has made a bad choice, he can go back in the conversation log, and correct his choice. This would be much easier then saying to the system "remember when you asked me what firewall I have, and I said that I don't have it, well I just discovered that I DO have a firewall"—which is a also a very hard sentence to understand.

Context Handler 26 can perform the following stages: (i) look in the session memory and check if the latest engine response has a special context defined in it; (ii) a special context means an area of the Knowledge Database that belongs to a NL Script command such as Multi command. A multi command is an example of multiple knowledge database entries that form a data structure.

For example, in the case of a NL Script for example, if the previous command that ran was Say: "please disable security settings" then a continued entry to it may be the statement answer pair: {"why?", "Because it's necessary to in order to continue, but don't wary we'll change it back when we're done"}.

Yet for another example, when the interaction application wants to clarify what the user meant by "what is apple", since there are two such statements in the knowledge database, then a temporary NL script is created and run by the response creator. That process would first: say "did you mean: 1. apple the computer company, or 2. apple the fruit.", then it point wait for a response and interpret it on the special context of: {input="1" or ="computer" or ="company", output=link to the answer of "what is C_apple_computer_company"} and similarly for the fruit repsonce.

If, for example, a special context is defined, then Matcher 19 can give precedence to database entries in this context, over database entries in the general context, so that if two similar entries exist—one in special context and the other in the general context—then the one in the special context is being chosen.

Another role of the context handler 26 conversation is that when a conversation is spanned over a specific topic, context handler 26 signals Matcher 109 to assign a higher weight to basic information units that appeared in the preceding dialogue.

Session Memory 29

Session memory 29 logs current conversations with each specific user 20, so that the context handler can check a user's input against the relevant conversation context. If a NL script was activated, it also logs the specific command that was run—enabling to interpret the next user input in the context of that command.

Behavior Unit 28

The inputs to behavior unit 28 are special events that are raised by the other units. Such as when matcher 19 did not find an appropriate response (an answerable statement) to the User's input. Or when the User clicks some link in the webpage, or when the User has asked a specific query. All these events were conveniently predefined by KM 11 when he is adding knowledge, and they are stored in conjunction to the relevant database entry in the Knowledge Database Behavior unit 28 can include a list of conditions how to act when it receives these events. A rule for example can be: "if you receive 3 times in a row a signal that the matcher cannot find a proper answer; run a NL Script that apologizes to the User and asks him if he wants to submit his query for a human representative". The behavior unit can dynamically create and run a NL Scripts or commands in response to some conditions or events.

Behavior unit 28 can be programmed to try to optimize some goal—such as the raising a user's interest and want to buy a certain product. The behaviors can include changing the computer responses according to the current "Computer Mood" that can be defined as a measurement of the success of the conversation, or politeness or rudeness of the User as determined by usage of bad language words.

If a user keeps asking or saying something that the system has no good response to, then the system can suggest him to send this problem for analysis by human (request human intervention). If he chooses, he can describe his problem and his feedback is stored and later shown to the KM that is maintaining this part of the knowledge database. The system can later try to contact the User (via email or via next time he logs into the interaction application) and update him on the progress of this issue. If more User ask a similar such issue in their conversations, the system can know that this is an important issue, give more importance to this issue, and let them know that this problem is being dealt with and that they too could be contacted when it is solved. This mechanism can be very useful for technological products that bugs or compatibility issues arise with them after the product has been launched and after and while the users have already bought and use them.

Recognizing such an new issue can be done by maintaining a list of unknown words—words that user is using but the system does not know, and a list of not-understood input, and the context which they appeared (the conversation log), such that when an unknown word or a not-understood input is repeat the system starts this behavior.

Feedback Unit 16

Feedback Unit 16 is used in order to facilitate the natural language communication between a computer and a human.

When a human converses with a computer in natural language the computer understands only part of what the human says. Among the many reasons for this partial or misunderstanding are: knowledge was not stored in the computer; User's statement is too complex, specific or involves unknown words, difficult grammar or sentence structure, misspellings etc. Our disclosed Feedback Unit 16 solves most of the above misunderstanding problems and others.

An aspect of feedback unit 16 is described in FIG. 3.

A human (can be a User 20, a Knowledge Manager 11 or other) is inputting, usually by typing, a statement, a portion of a statement, a response to a request to receive answerable statement selection information or a statement into the Input Box 31. As the human types, feedback unit 16 is continuously trying to predict what the human is trying to write or ask, and suggests it to him in the Suggestions Box 32. Sometimes there are many ways to complete a word or a sentence to a proper sentence that is stored in the Knowledge Database; in this case the feedback Unit takes these possible matches and groups them together so that the User is not being presented by too many options. Examples follow. The highly probable suggestions will be positioned in a more visible way than others (for example higher in the list or with a bolder font), and related suggestions can be grouped. If the Feedback Unit 16 does not find a good match between what the user input and especially basic information units representative of the user input and between the knowledge in the Knowledge Database 13, it suggests according to some logic, the closest pieces of knowledge that it can find (for example—answerable statements or portions of answerable statements). The human observes, as he types, the suggestions in the Suggestions Box 32, and adopt his sentence or statement according to the suggestions. By doing so, the human saves time and effort, since he is not phrasing a complex sentence only to find out that the computer does not know how to answer it. Example 1 in FIG. 3 demonstrates the above. The "|" sign in the Input Box 31 signifies the cursor position when typing. In step 1.1 the human is writing "How can", and gets two suggestions "How can I . . . " and "How can you . . . ". The suggestions are provided due to their past popularity or since answerable statements in the Knowledge Database start with these words. In step 1.2 the human chooses-"How can I" (either by typing or by means such as mouse or by designated keyboard keys) and the computer updates the suggestions to "How can I receive . . . " and "How can I send . . . " and "more . . . ". The "more." is used to designate that there are more possible completions to the user text, but they are not show so as not to overload the human, but the user can, by choosing "more . . . ", see these extra suggestions behind it. In step 1.3, the human types 'o' and the computer updates the suggestions to words that start with the letter 'o'. And finally in step 1.4, the human chooses "how can I open an account", sends his request (by the "enter key" or mouse click for example), and passes the final request to subsequent systems (to KMA 12, to the Interaction Application 21, or to any other process.). By going through this process the user is guaranteed that an answering entity will be able to respond to the user's input. Without performing this iterative process, an answering entity (in cases where the user input does not match an expected input) would not be able to answer the statement. In that case the answering system would have responded by stating that it doesn't have the user text, or by asking for clarifications. The human would have needed to answer this clarification, or to post a slightly modified query, making the whole process slow, cumbersome and ineffective from the human perspective.

Any time the system (or method) offers the user choice (such as when there are a few possible completions—few answerable statements (or their portions) that can at least partially match the user input—or when it (the system or method) is not sure what the user meant) and the User is making a choice—is an opportunity for the system to improve over time, by keeping records of what users are picking (and give it higher rank in the future) and what they are not picking (and give it lower rank)

In FIG. 3A, Example 2, Step 2.2 a human misspells the word "email". The computer signals the possible error by some kind of mark on the word itself or elsewhere and either automatically corrects, or suggests a correction to the misspelling.

In Step 2.3 even though the humans statement is clear to the answering system the user can still be provided with possible refinements on the user's statement that might be helpful to the user.

In step 2.4, the user has asked a specific statement with the phrase "to the moon" that is not understandable to the computer. The computer signals to the user that this phrase is not understandable to him by, for example, strikethroughs on this section and suggests alternatives. By seeing this signal the human understands that the specific statement he asked cannot be answered by the computer but that the more general statement "can I send emails", and the other suggestions, can be answered. This saves the human and computer the need to go through a conversation such as: "I don't know if you can send emails to the moon, but I can answer to you if you can send emails". Notice that the computer is not restricted to suggesting sentences that strictly complete the human input but rather any related sentence can be presented. And the differentiating or similar words in the suggested sentences can be highlighted or otherwise marked for easier human readability.

In example 3, steps 3.1 and 3.2, the human is inputting the keyword 'email'. The Feedback Unit 16 is suggesting a WH-statement about 'email', a phrase such as 'email password' and a recurring word-pair such as 'sending email'. In step 3.3 the human is choosing 'receiving email' and the computer suggests statements such as 'how to receive email', and an extended phrase such as "receiving email from the web". In the mentioned examples, the Feedback Unit 16

Feedback Unit 16 is conveniently resistant to language and conceptual permutations. A user can ask the same statement in many different ways, and the Feedback Unit 16 will treat all these as the same basic statement. This differentiates our invention from standard auto-complete systems that merely complete a sentence according to its beginning. In our Feedback Unit 16, if a human writes "I would like to know about X", the beginning words would either be disregarded and the sentence be transformed to "X", or better of, the sentence would be transformed to "what is X". Another example is that if a human writes "I would like to know the location of X", then the computer will transform it to "where is X" and feedback on it. The above mechanism can be implemented either by using a table of language pattern transformations, or by omitting words and phrases that are not specific and focusing on the keywords. Another example is handling of synonym words and word transformations. So that if "to image" and "imaging" and "to picture" can be used by a human and the suggestions, if appropriate, would be similar. And in order to make things clearer to the human, suggestions can match his choice of words, either "to image in dark", "imaging in dark" "to picture in dark" respectively. The above can be implemented by using word stemming and by using a custom or general purpose thesaurus.

In order to make the list of suggestions shorter and thus easier for the user to read through, feedback unit 16 can use the conversation state, conversation context, statement frequency, and user profile. From that information, feedback unit 16 can predict better how to complete or adjust the user statement. Additionally, the computer can learn what suggestions users like best for this text, and adopt its suggestion list when making this same suggestion in the future.

FIG. 3B is an illustrative flow chart of the Feedback Unit 16. Typed input (user input) 33 is processed for language words, keywords, unknown words, grammar, language patterns and sentence structure, by the processing units (Sentence Processing 14, Context Handler, Converter to Structured Form, Matcher) and compared with available knowledge in the Knowledge Database 13. In the next stage 34, suggestions are being created and ordered according to relevancy and are being backward transformed from structure to unstructured text that looks as much as possible similar to the way the User expressed his query. This conversion means converting a basic information unit to the specific word that the User used, or converting a basic information unit of language such as "C_What_Is" to the specific User words may it be "tell me about" or "give me information on" or "define"—all synonyms phrases in the Knowledge Database.

In the case where there are many possible suggestions they are being grouped 35 to not overwhelm, the user, and are being presented to the human in the Suggestions Box 32. The grouping reflects that multiple answerable statements are associated with each other. The next stage depends on the user—if he continues to type, then whole process continues, if he accepts (sends an acceptance indication) a suggestion (an accepted answerable statement) then the Input Box 31 is updated, all this until he finishes writing and wants the system to react.

This grouping mechanism can also be used in the response creator 27, in which case it would be translated to a natural language script that asks: "are you interested more in 1. Group1, 2. Group2, or 3. Group3", where instead of writing Group 1 the common basic information units behind this group would be presented.

The feedback mechanism is active all throughout the User's Input process. It can continuously (or non-continuously) monitor the output of the sentence analyzer and structure form converter (as the User is typing or inputting his statement or statement) and shows the User the intermediate or final results of these units. In the form that is describe more fully in FIGS. 3, 3a,3b.

This can be useful for electronic devises with small screen—such as cellular phones, and the picking from the list could preferably be done by saying "one" "two" . . . etc, and using a simple speech recognition mechanism Similar guidelines as described above can be used to implement a feedback mechanism for users who use speech as input. In this case speech recognition and possibly speech synthesis converters will be added to the scheme. It is known that speech recognition is not accurate enough to fully translate user's voice into text. But, by integrating it with our Feedback mechanism, a human would be able to use these systems without being so frustrated by their low recognition performance. The way it would work is that the feedback mechanism will present to the user on the fly a list of queries and the user will choose among them. This would allow the user to communicate with the computer without typing, rather by using his voice and possibly pointing device, which can be more convenient in some scenarios such as with small devices—PDAs, Cell phones.

Responding to the User

The nature of many interactions such as customer support interactions is that a User asked an initial statement or states a problem or symptom, and the Agent identifies the issue from all the knowledge base content and either (i) Gives a direct answer or (ii) starts a flow-chart like process of asking the User for additional details and guiding him through the process according to his answers.

The direct answer situation is handled by our statement-answer pairs

The statement part is stored as structured form, and the answer part is stored as is in unstructured form. The statement part should include multiple different ways of expressing the same idea. For example: "how to see what I have sent" "where is the sent-items folder" "how to find a mail I have sent", but it can sometimes be effectively shrunken by adding synonyms instead of adding different ways of saying.

Natural Language Scripts

Flow chart like processes can be managed by Natural Language Scripts defined below. (Natural Language Script is also referred to as semi-open conversation method).

A Natural Language Script (NL Script) is a statement-program pair. The program is a sequence of simple commands.

FIG. 4 illustrates a command 100 according to an embodiment of the invention.

A knowledge database entry includes an expected user statement field and at least one action field. Multi command 90 is an example of multiple entries of the knowledge database that form a data structure that includes multiple expected user statements fields (such as the multiple "statement" fields included within each row of multi command 90) that match an expected sequence of user textual inputs. Conveniently, at least one action field such as the "Say" field, includes through the "NextCmd" field a link to another knowledge database entry (that can be identified by its ID value) that includes another expected user statement field and at least one other action field. The commands within the Multi command are linked to each other. A user can be provided with a graphical representation of these commands, whereas the graphical representation includes the various links.

Referring to FIG. 4, a user is expected to provide a first statement (such as the statement included in the statement field of "Multi") after which the Multi command will present to the user the Multi command's "Say" field content, and then the user is expected to provide one or more statements that are included in the statement field of either one of MultiItem 1 or Multiitem M).

Multi command 90 may include one or more MultiItems commands (90(1)-90(M)), and it can be used to manage multiple responses thus simplifying the task of the KM.

A multi command run's either when it is called by another command, or when the User's input has matched its one of the structured forms stored in its 'statement' field.

When a multi command is run, the application outputs (responds by) its 'say' value (this statement can be an answer or a question to the user), and stores a link of itself in the Context Handler 26. Next time the User inputs something, the Context Handler returns to the stored Multi and checks if the User's input matches against any of the MultiItem statement field. If a match is found, the relevant MultiItem starts and displays its 'Say' field's content. NextCmd field can contain a 'goto (id)' statement or 'call (id1, id2)' statement—which is equivalent to "goto (id1) and when finished goto (id2)". If a multiitem has something in its NextCmd field, then this NextCmd is executed when the MultiItem finishes.

A multiitem is also stored separately in the KD and can start independently when its 'statement' field matches a User input, regardless if its parent Multi command was activated or not.

The 'DisplayedAs' and 'DisplayOptions' fields are used for cases where the KM wants to present the Multiitems as options for the user to choose (such as with radio buttons GUI), the displayedAs field controls how the multiitem will be displayed as, and the DisplayOptions determine if, when, and how to display it. (i.e. display when multi run, or when user response to the multi is such that it is clear he needs help in making his choosing).

Two additional commands that can be useful too are "input" command that takes something the user has said and stores it in some variable to later be used. And an "if" command, that compares a variable's content with some value and acts upon it.

The NL Scripts can be displayed in a table as exemplified here, or visual graph where the nodes are the commands and the links are the 'nextcmds'. The later can be easier to handle when the Scripts become large. It is noted that each row of the table can be stored in a single entry of the knowledge database. The "statement" field can be regarded as the expected user statements field of the knowledge database entry while either field out of "say", "DisplayedAS", "Display options" and "nextCmd" can be regarded as action information.

TABLE 1 illustrates a sample multi command according to an embodiment of the invention.

| Command Type | Id | Statement | Say | DisplayedAs | Display Options | NextCmd |
|---|---|---|---|---|---|---|
| Multi | A | My camera isn't shooting pictures | Ok, did you turn it on? | — | — | — |
| MultiItem | A1 | Yes | Ok. | Yes | Show | Goto(B) |
| MultiItem | A2 | No | Ok, turn it on and then try to shoot pictures. | No | Show | End |
| MultiItem | A3 | I don't know/ how to | To turn on the camera press the button marked in the figure to your right | How to turn on camera | Show | Goto(A) |
| Multi | B | — | What happens when you try to shoot pictures? | — | — | — |
| MultiItem | B1 | My camera turned off by itself. | Your battery is empty. Please charge it. | The camera turns off | Show | |
| MultiItem | B2 | Nothing happens | Try again, this time press the button harder | Nothing Happens | Show | Goto(B) |

Table 1 can enable the following conversation:

User: I can't shoot pictures

System: Did you mean to say: "my camera isn't shooting pictures" (since the match is not exact, the system asks)

User: yes

System: ok, did you turn it on?

User: of course ("of course" is a general sysnonome to "yes" so it is understood).

System: What happens when you try to shoot pictures?

User: I hear a strange noise.

System: I don't know about this, choose from:

a. The camera turns off b. Nothing Happens

User: that's not what happened. (this user input evokes an event of user not satisfied)

System: I can't offer further help on this. Would you like me to send your problem for further analysis, and to contact you when a solution is available?

User: sure

System: ok, pls give your email address and we'll get back to you with further recommendations. (The system saves the unidentified input "I hear a strange noise" together with the exact context it happened (as an answer to "What happens when you try to shoot pictures?"), and this incident is review and the knowledge gap can be filled by a the KM.)

FIG. 5 illustrates method 200 for providing a response to a statement of a user, according to an embodiment of the invention. Method 200 starts by stage 210 of receiving user input that includes a portion of a user statement.

Stage 210 is followed by stage 220 of selecting, before receiving the whole user statement, an answerable statement response. The answerable statement response can be selected out of an answerable statement, multiple answerable statements or a response to an answerable statement. The selecting is responsive to user input and to structured representations of answerable statements answerable by an answering entity. Stage 220 is followed by stage 240 of sending to the user the answerable statement response.

If the answerable statement response includes the response to an answerable statement than stage 240 can be followed by stage 210. Else, stage 240 is followed by stage 250 of receiving a user response.

Stages 220-250 can continue until receiving an acceptance indication from the user indicative of a user acceptance of an answerable statement.

It is noted that during stage 250 the user can change the previously inputted portion of user statement or provide another portion of a user statement, can select between multiple answerable statements sent to the user during stage 220, can respond to a request to receive answerable statement selection information, or can send the acceptance indication.

Conveniently, method 200 can receive one portion of the user statement and respond by sending to the user one or more answerable statements, then receive another portion of the user statement and respond by sending the previously sent one or more answerable statements or send other answerable statements.

Conveniently, when multiple answerable statements are presented to the user they may include answerable statements that at least partially match the user input. Thus, answerable statements can be grouped together to form answerable statement groups. Each group includes answerable statements that are associated with each other. This associated can exceed a predefined association threshold.

Conveniently, stage 250 can include receiving an audio acceptance indication from the user. This audio acceptance indication can confirm ("approve", "accept") a single answerable statement displayed to the user or can select ("the first option", or "one") between multiple answerable statements displayed to the user.

According to another embodiment of the invention a user can receive an audio indication representative of one or more answerable statements.

Conveniently, stage 220 of selecting includes performing a weighted comparison between basic information units extracted from the user input to basic information units associated with each of the multiple answerable statements. It is noted that the weighted comparison can be preceded by searching an entire answerable statements data structure (for example the whole knowledge database) or just a portion thereof.

Conveniently, multiple iterations of stages 220-250 can occur during a single session of a typing of a single user statement. A typing of an additional word or of few additional symbols can trigger a new iteration. These iterations can occur in real time or nearly in real time.

For example, two iterations of stages 210-250 can include: receiving user input that includes a first portion of a user statement; selecting an answerable statement response between an answerable statement, multiple answerable statements and a request to receive answerable statement selection information; wherein the selecting is responsive to the user input and to structured representations of answerable statements answerable by an answering entity; sending to the user the answerable statement response; receiving user input that includes a second portion of a user statement; selecting an answerable statement response between an answerable statement, multiple answerable statements and a request to receive answerable statement selection information; wherein the selecting is responsive to the first portion and to the second portion of the user statement; sending to the user the answerable statement response and receiving an acceptance indication from the user indicative of a user acceptance of an answerable statement.

Stage 250 is followed by stage 260 of sending to the answering entity information representative of the accepted answerable statement. This information can include one or more basic information units.

Stage 260 is followed by stage 270 of receiving from the answering entity the answering entity response. The answering entity can be, for example, a knowledge database that can be accessed by an interaction application.

Stage 270 is followed by stage 280 of sending to the user information representative of the answering entity response. Conveniently, the answering entity sends one or more basic information units representative of an answer. Stage 280 include (or is preceded by) converting these basic information units to an answer that includes additional information, alternative information and the like.

According to an embodiment of the invention stage 220-250 do not result in a provision of an acceptable response. Thus, a user is not presented with a good enough answerable statement or the answering entity response is not acceptable. The user can indicate that an unacceptable response was received (for example—by sending a dissatisfaction message) or the method can determine that such a problem occurred—especially if the number of iterations of stage 220-250 exceeds a certain threshold.

Method 200 and specially stage 220 can include utilizing (for example by accessing and processing) a knowledge database entry that includes an expected user statement field and at least one action field. Multi command 90 is an example of multiple entries of the knowledge database that form a data structure that includes multiple expected user statements fields (such as the multiple "statement" fields included within each row of multi command 90) that match an expected sequence of user textual inputs. Conveniently, at least one action field (such as the NextCmd" field) includes a link to another knowledge database entry (that can be identified by its ID value) that includes another expected user statement field and at least one other action field. The commands within the Multi command are linked to each other. A user can be provided with a graphical representation of these commands, whereas the graphical representation includes the various links.

Conveniently, method 200 includes stage 290 of storing at least a portion of the information that was exchanged during stages 210-280. This information (and especially previous answerable statements sent to the user) can be displayed to a user (as illustrated in stage 300) in order to enable the user to alter a previous selection he made. Stage 300 conveniently includes presenting to the user multiple answerable statements that were sent to the user and resulted in an acceptance of a certain answerable statement by the user.

Accordingly, stage 300 can be followed by stage 250. Stage 250 can include receiving an acceptance indication from the user indicative of an acceptance of another answerable statement out of the multiple answerable statements.

Conveniently, method 200 further includes stage 310 of updating selection metadata in view of at least one response of at least one user to at least one answerable statement response. The selection metadata affects the selection of the answerable statement response. Such metadata can be the number of times that users have accepted an answerable statement relative to number users have accepted other answerable statements for similar or related user inputs.

Conveniently, the method includes applying natural language scripts during the selecting of the answerable statement.

Conveniently, the method includes selecting a single answerable statement if the single answerable statement and the user input are characterized by a matching value that exceeds a first threshold and selecting multiple answerable statements if each of the multiple answerable statements and the user input are characterized by a matching value that exceeds a second threshold but is below the first threshold.

The multiple answerable questions can include answerable questions that at least partially match the user input.

Conveniently, the method includes presenting to the user multiple answerable questions that were sent to the user and resulted in an acceptance of a certain answerable question by the user; and receiving an acceptance indication from the user indicative of an acceptance of another answerable question out of the multiple answerable questions.

Conveniently, the method includes: receiving user input that comprises a first portion of a user question; selecting an answerable question response between an answerable question, multiple answerable questions and a request to receive answerable question selection information; wherein the selecting is responsive to the user input and to structured representations of answerable questions answerable by an answering entity; sending to the user the answerable question response; receiving user input that comprises a second portion of a user question; selecting an answerable question response between an answerable question, multiple answerable questions and a request to receive answerable question selection information; wherein the selecting is responsive to the first portion and to the second portion of the user question; sending to the user the answerable question response; receiving an acceptance indication from the user indicative of a user acceptance of an answerable question; sending to the answering entity information representative of the accepted answerable question; receiving from the answering entity the answering entity response; and sending to the user information representative of the answering entity response.

According to an embodiment of the invention stage 210 is preceded by stage 100 of generating a knowledge database of an answering entity by converting knowledge manager input into a structured representation of the knowledge manager input. Conveniently, stage 100 includes providing to the knowledge manager input feedback information indicating a suggested knowledge manager input.

According to various embodiment of the invention stage 100 can be applied on knowledge manager input in an almost analogues manner as other stages of method 200 are applied on a user input. The main difference stems from the fact that during stage 110 answerable statements can be defined while during other stages of method 200 answerable statements were already defined. For example, stage 100 can include responding to textual and/or audio input from the user.

According to another embodiment of the invention stage 220 can also include selecting an answer to an answerable statement. In this case stage 220 can be followed by stage 240 of sending to the user the answer to an answerable statement and skipping stages 260-270. It is noted that according to another embodiment of the invention the answering entity can include the intermediate entity. In this case a single entity performs these multiple stage of method 200.

According to an embodiment of the invention method 200 includes comparing the user input to a data structure that includes multiple commands, each command comprises: (i) an expected user statement fields; (ii) a command identification field; (iii) action information representative of an action to be executed; (iv) next command to be executed field.

It is noted that the action information can indicate to send an answer to a user answerable statement, to send to a user one or more answerable responses and the like.

Such a data structure can represent a flow chart that includes multiple expected actions and responses.

Conveniently, the information representative of the response to the user statement resembles the user statement. Thus, information that is send (and eventually presented to the user) can resemble the statement of the user in the form of choice of words and sentence structure. Conveniently, this resemblance is aimed to ease a comparison (done by the user) between users statements and the user input.

FIG. 6 illustrates method 400 according to an embodiment of the invention.

Method 400 starts by stage 410 of receiving a user textual input. It is noted that the user input can be a user statement. It is further noted that the user can input a textual input but can also provide audio input that is converted to textual input.

Stage 410 is followed by stage 420 of matching a structured representation of the user textual input against expected statement fields of knowledge database entries. The knowledge database entry includes an expected user statement field and at least one action field. Multiple entries of the knowledge database form a data structure that comprises multiple expected user statements fields that match an expected sequence of user textual inputs.

Conveniently, at least one action field includes a link to another knowledge database entry that comprises another expected user statement field and at least one other action field.

Stage 420 is followed by stage 430 of responding to the user in response to the matching.

Conveniently, the method includes stage 440 of graphically displaying (to the user) links between multiple linked knowledge database entries that form the data structure.

Conveniently, an action field includes a flow control commands such as an "if" command, an else command, a call command, a goto command, or an input command.

Conveniently, the method includes stage 450 of detecting a need to request an intervention of a third party to respond to user input.

Conveniently, the method includes stage 460 of allowing a user to review previous user inputs and previous responses and to choose to alter a previous input or selection of the user and get an updated response.

Conveniently, the expected statement field comprises a natural language response.

Conveniently, the expected statement field of a single knowledge database entry comprises at least one concise ways of expressing a single idea.

Conveniently, the expected statement field of a single knowledge database entry comprises at least one synonym.

Conveniently, multiple knowledge database entries are represented by flow-chart like elements.

Conveniently, knowledge database entries are chained sequentially.

Conveniently, the method includes comprising detecting problematic knowledge database entries and indicating that they should be improved.

Conveniently, a method and computer program product are provided. The method includes converting knowledge to a computer usable format by breaking up the pieces of knowledge to groups of independent and dependent ideas, including questions and answers about the knowledge, expressing these ideas in concise natural language statements and connecting related statement in sequential form, so that an answer is connected to a question, a question can be connected to a clarifying question.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Conveniently a computer program product that includes a computer usable medium is provided. The computer program product includes a computer readable program for providing a response to a statement of a user, wherein the computer readable program when executed on a computer causes the computer to: receive user input that comprises at least a portion of a user statement; select an answerable statement response between an answerable statement, multiple answerable statements and a request to receive answerable statement selection information; wherein the selecting is responsive to user input and to structured representations of answerable statements answerable by an answering entity; send to the user the answerable statement response; receive an acceptance indication from the user indicative of a user acceptance of an answerable statement; send to the answering entity information representative of the accepted answerable statement; receive from the answering entity the answering entity response; and send to the user information representative of the answering entity response.

Variations, modifications, and other implementations of what is described herein will occur to those of ordinary skill in the art without departing from the spirit and the scope of the invention as claimed.

Accordingly, the invention is to be defined not by the preceding illustrative description but instead by the spirit and scope of the following claims.

We claim:

1. A method of operating a computer to provide a response to a received user input, the method comprising:
    automatically with the computer:
        (a) in response to receiving, from a user's device, a partial user input signifying a portion of an answerable statement, before receiving a full user input representing the entire answerable statement, calculating for each of a plurality of predefined answerable statements, a match metric denoting a degree to which the partial user input matches the predefined answerable statement; and
        (b) (1) if the match metric for one of the predefined answerable statements exceeds a first threshold, sending, to the user's device, information representing a response associated with said one of the predefined answerable statements, and
        (2) if part (b)(1) does not apply but the match metric for at least one of the predefined answerable statements exceeds a second threshold, which second threshold is lower than the first threshold, sending, to the user's device, information representing the corresponding at least one of the predefined answerable statements.

2. The method of claim 1 further comprising automatically with the computer, after performing part (b), in response to receiving, from the user's device, an additional user input representative of a further portion of the full user input, repeating parts (a) and (b) with the additional user input being included in the partial user input.

3. The method of claim 2 further comprising, if part (b)(2) applies, automatically with the computer, in response to receiving, from the user's device, information indicative of a user's acceptance of one of the at least one of the predefined answerable statements in part (b)(2), sending, to the user's device, information representing a response associated with said accepted one of the at least one of the predefined answerable statements.

4. The method of claim 1 further comprising, if part (b)(2) applies, automatically with the computer, in response to receiving, from the user's device, information indicative of a user's acceptance of one of the at least one of the predefined answerable statements in part (b)(2), sending, to the user's device, information representing a response associated with said accepted one of the at least one of the predefined answerable statements.

5. The method of claim 1 wherein part (b)(2) further comprises sending, to the user's device, information representing the match metric calculated for each of the corresponding at least one of the predefined answerable statements.

6. The method of claim 1 further comprising, if no match metric exceeds the second threshold, automatically with the computer sending, to the user's device, information indicating the computer is unable to provide a response to the partial user input.

7. The method of claim 1 further comprising, if no match metric exceeds the second threshold, automatically with the computer sending, to the user's device, a question asking for clarification of the answerable statement intended by the user.

8. The method of claim 1 wherein the information in part (b)(2) comprises alternative suggestions for completing the partial user input.

9. The method of claim 1 wherein part (b)(2) further comprises, automatically with the computer accessing stored computer records of frequencies with which a plurality of previous users have presented the predefined answerable statements, and wherein the information sent to the user's device is ranked in order of the frequencies.

10. A data processing system having at least one processor capable of providing an automatic response to a received user input, the system being programmed to automatically:
 (a) in response to receiving, from a user's device, a partial user input signifying a portion of an answerable statement, before receiving a full user input representing the entire answerable statement, calculate for each of a plurality of predefined answerable statements, a match metric denoting a degree to which the partial user input matches the predefined answerable statement; and
 (b) (1) if the match metric for one of the predefined answerable statements exceeds a first threshold, send, to the user's device, information representing a response associated with said one of the predefined answerable statements, and
  (2) if part (b)(1) does not apply but the match metric for at least one of the predefined answerable statements exceeds a second threshold, which second threshold is lower than the first threshold, send, to the user's device, information representing the corresponding at least one of the predefined answerable statements.

11. The data processing system of claim 10 wherein the system is further programmed, after performing part (b), in response to receiving, from the user's device, an additional user input representative of a further portion of the full user input, to automatically repeat parts (a) and (b) with the additional user input being included in the partial user input.

12. The data processing system of claim 11 wherein the system is further programmed, if part (b)(2) applies, in response to receiving, from the user's device, information indicative of a user's acceptance of one of the at least one of the predefined answerable statements in part (b)(2), to automatically send, to the user's device, information representing a response associated with said accepted one of the at least one of the predefined answerable statements.

13. The data processing system of claim 10 wherein the system is further programmed, if part (b)(2) applies, in response to receiving, from the user's device, information indicative of a user's acceptance of one of the at least one of the predefined answerable statements in part (b)(2), to automatically send, to the user's device, information representing a response associated with said accepted one of the at least one of the predefined answerable statements.

14. The data processing system of claim 10 wherein the system is further programmed, if part (b)(2) applies, to automatically send, to the user's device, information representing the match metric calculated for each of the corresponding at least one of the predefined answerable statements.

15. The data processing system of claim 10 wherein the system is further programmed, if no match metric exceeds the second threshold, to automatically send, to the user's device, information indicating the computer is unable to provide a response to the partial user input.

16. The data processing system of claim 10 wherein the system is further programmed, if no match metric exceeds the second threshold, to automatically send, to the user's device, a question asking for clarification of the answerable statement intended by the user.

17. The data processing system of claim 10 wherein the information in part (b)(2) comprises alternative suggestions for completing the partial user input.

18. The data processing system of claim 10 wherein the system is further programmed, if part (b)(2) applies, to automatically access stored computer records of frequencies with which a plurality of previous users have presented the predefined answerable statements, and wherein the information sent to the user's device is ranked in order of the frequencies.

19. A non-transitory computer-readable medium storing a set of computer instructions to provide a response to a received user input, wherein the set of computer instructions, when executed on a computer, causes the computer, automatically:
 (a) in response to receiving, from a user's device, a partial user input signifying a portion of an answerable statement, before receiving a full user input representing the entire answerable statement, to calculate for each of a plurality of predefined answerable statements, a match metric denoting a degree to which the partial user input matches the predefined answerable statement; and
 (b) (1) if the match metric for one of the predefined answerable statements exceeds a first threshold, to send, to the user's device, information representing a response associated with said one of the predefined answerable statements, and
  (2) if part (b)(1) does not apply but the match metric for at least one of the predefined answerable statements exceeds a second threshold, which second threshold is lower than the first threshold, to send, to the user's device, information representing the corresponding at least one of the predefined answerable statements.

20. The non-transitory computer-readable medium of claim 19 wherein, further, the set of computer instructions, when executed on the computer, causes the computer, after performing part (b), in response to receiving, from the user's device, an additional user input representative of a further portion of the full user input, to automatically repeat parts (a) and (b) with the additional user input being included in the partial user input.

21. The non-transitory computer-readable medium of claim 20 wherein, further, the set of computer instructions, when executed on the computer, causes the computer, if part (b)(2) applies, in response to receiving, from the user's device, information indicative of a user's acceptance of one of the at least one of the predefined answerable statements in part (b)(2), to automatically send, to the user's device, information representing a response associated with said accepted one of the at least one of the predefined answerable statements.

22. The non-transitory computer-readable medium of claim 19 wherein, further, the set of computer instructions, when executed on the computer, causes the computer, if part (b)(2) applies, in response to receiving, from the user's device, information indicative of a user's acceptance of one of the at least one of the predefined answerable statements in part (b)(2), to automatically send, to the user's device, information representing a response associated with said accepted one of the at least one of the predefined answerable statements.

23. The non-transitory computer-readable medium of claim 19 wherein, further, the set of computer instructions, when executed on the computer, causes the computer, if part (b)(2) applies, to automatically send, to the user's device, information representing the match metric calculated for each of the corresponding at least one of the predefined answerable statements.

24. The non-transitory computer-readable medium of claim 19 wherein, further, the set of computer instructions, when executed on the computer, causes the computer, if no match metric exceeds the second threshold, to automatically send, to the user's device, information indicating the computer is unable to provide a response to the partial user input.

25. The non-transitory computer-readable medium of claim 19 wherein, further, the set of computer instructions, when executed on the computer, causes the computer, if no match metric exceeds the second threshold, to automatically send, to the user's device, a question asking for clarification of the answerable statement intended by the user.

26. The non-transitory computer-readable medium of claim 19 wherein the information in part (b)(2) comprises alternative suggestions for completing the partial user input.

27. The non-transitory computer-readable medium of claim 19 wherein, further, the set of computer instructions, when executed on the computer, causes the computer, if part (b)(2) applies, to automatically access stored computer records of frequencies with which a plurality of previous users have presented the predefined answerable statements, and wherein the information sent to the user's device is ranked in order of the frequencies.

* * * * *